United States Patent [19]

Kull

[11] Patent Number: 5,744,707

[45] Date of Patent: Apr. 28, 1998

[54] TRAIN BRAKE PERFORMANCE MONITOR

[75] Inventor: Robert C. Kull, Olney, Md.

[73] Assignee: Westinghouse Air Brake Company, Wilmerding, Pa.

[21] Appl. No.: 601,688

[22] Filed: Feb. 15, 1996

[51] Int. Cl.[6] .................................................. G01L 5/28
[52] U.S. Cl. ........................... 73/121; 73/129; 340/453
[58] Field of Search ........................... 73/121, 123, 126, 73/129, 130; 340/453, 454

[56] References Cited

U.S. PATENT DOCUMENTS

| | | | |
|---|---|---|---|
| 4,098,111 | 7/1978 | Hardmark et al. | 73/129 |
| 4,440,015 | 4/1984 | Hann | 73/121 |
| 4,627,011 | 12/1986 | Spencer et al. | 73/121 |
| 4,847,770 | 7/1989 | Kane et al. | 73/129 |
| 4,895,021 | 1/1990 | Ishizeki | 73/129 |
| 5,038,605 | 8/1991 | Tews et al. | 73/129 |
| 5,299,452 | 4/1994 | Caron et al. | 73/129 |
| 5,327,782 | 7/1994 | Sato et al. | 73/129 |

*Primary Examiner*—George M. Dombroske
*Attorney, Agent, or Firm*—James Ray & Associates

[57] ABSTRACT

Method and apparatus for monitoring brake performance and updating information relating to brake performance while a train is in motion. A computer on the train is provided with inputs for grade information, axle speed, brakepipe pressure, and locomotive tractive effort. During brake applications when the train is in motion, calculations are made by the computer to update parameters which relate to braking performance, and to generate signals representing those parameters.

18 Claims, 1 Drawing Sheet

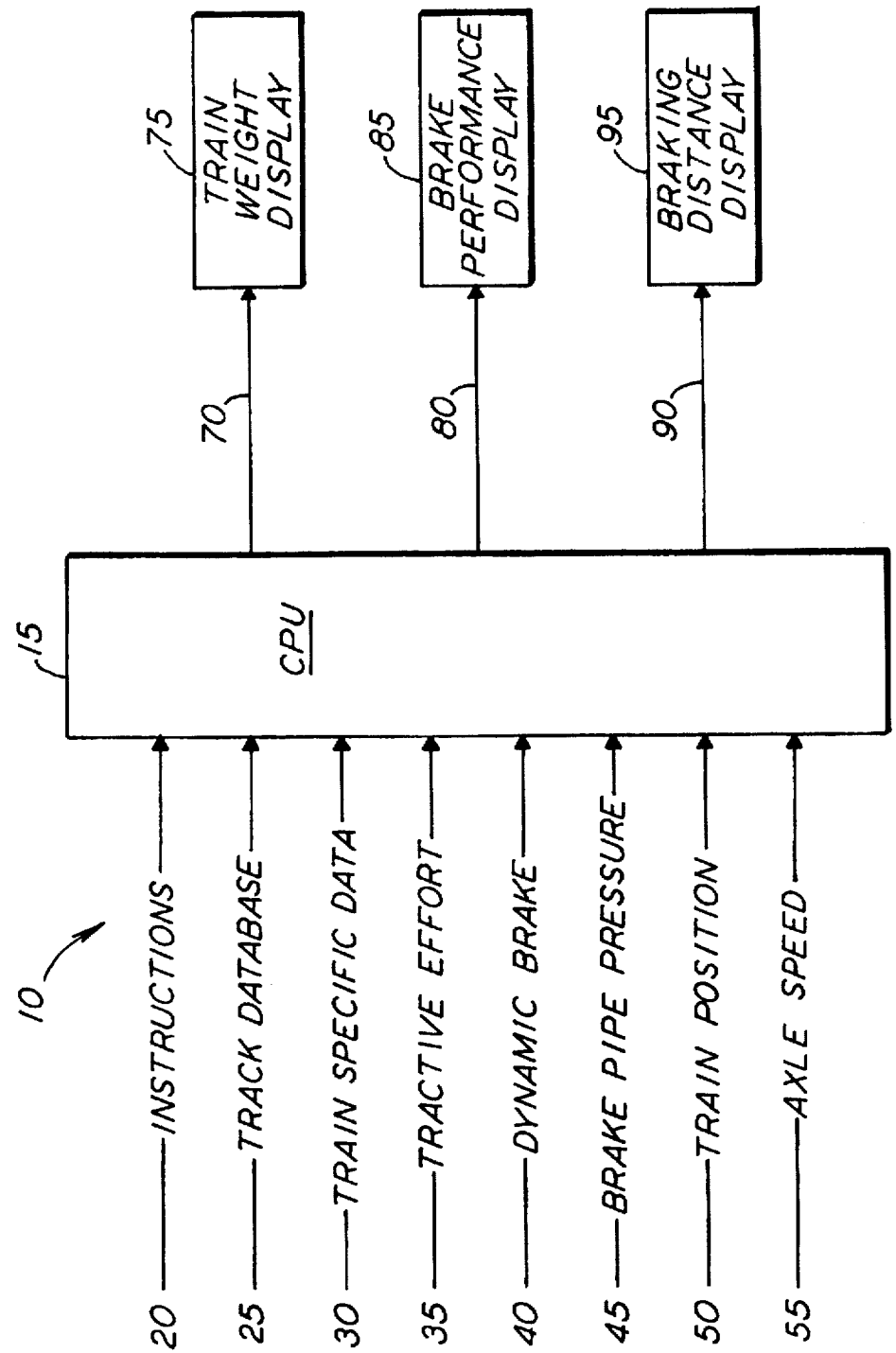

TRAIN BRAKE PERFORMANCE MONITOR

FIELD OF THE INVENTION

The present invention relates, in general, to the field of railway braking systems and, more particularly, this invention relates to a system for monitoring and control of a railway braking system.

BACKGROUND OF THE INVENTION

Many factors affect the braking performance of a train. These include train length and numbers and distributions of cars and locomotives; train weight and weight distribution over the train length; brake valve types on each car; brake rigging adjustment on each car; braking ratio on each car; brake shoe type, condition, and alignment on each car; locomotive braking effort, both air and dynamic brakes. In addition, characteristics of the track such as grade and curves over the braking distance impact the braking capabilities of the train.

The Federal Railroad Administration (FRA) has established rules and guidelines relating to the inspection of train brakes. These rules currently require initial terminal testing be performed prior to a train's departure and, also, require an in-route test at least every 1,000 miles, with a visual inspection of each car in the train. While this inspection can reveal certain types of obvious defects, such as missing brake shoes, there are other types of defects which would not typically be detectable by a visual inspection.

Skilled and experienced engineers can, to a degree, determine how well their train brakes are performing, in a subjective manner by "feel" of the train response to braking applications. However, it is very difficult for the average engineer to accurately determine whether the brake system is performing at a minimally acceptable level, due to the number of variables in different trains, the large time lag in brake actions taking effect, and significant impacts from relatively small changes in grade over the braking distance. The net result is that it is not practical to expect an average engineer to be able to detect brake system defects which may result in performance below what would be considered as a safe minimum level.

In addition, due to the uncertainties of existing train braking performance capabilities and the generally slow brake response time, locomotive engineers typically apply more braking than required to achieve a desired speed reduction. Since standard brake systems, as presently used in North America (AAR), do not have graduated release capabilities, engineers will typically need to apply locomotive power in order to compensate for over braking conditions. This "power braking" procedure clearly results in increased wear and tear on the train, as well as wastes costly fuel.

On-board "Automatic Train Protection" (ATP) and/or "Advanced Train Control Systems" (ATCS) which are designed to enforce safe stopping distances also need to predict train stopping distance capabilities. Prior art systems use a fixed braking formula, which may take into account some known parameters, such as train length and average grade, but do not account for variations in actual braking performance capabilities. These variations become more pronounced for long heavy mixed freight trains. The result is for systems to be designed as overly restrictive, in order to maintain a safety margin to account for a level of poor braking performance. This results in the undesirable imposition of more restrictive train operations, which can negatively impact line capacity and restrict the economic practicality of implementing these safety enhancement systems.

The present invention is intended to address these shortcomings in existing braking systems.

SUMMARY OF THE INVENTION

In a first aspect, the present invention provides a method for providing improved control of brakes on railroad cars in a train. The method involves providing signals indicative of grade information to a computer on the train, providing the computer with signals indicating axle speed, providing the computer with signals indicating brakepipe pressure, and providing the computer with signals indicating tractive effort from the locomotive or locomotives. The method also involves providing the computer with signals embodying a computer program for utilizing the signals indicating grade information, the signals indicating axle speed, the signals indicating brakepipe pressure and the signals indicating tractive effort to generate signals indicative of braking efficiency.

In a second aspect, the present invention provides apparatus for providing improved control of brakes on railroad cars in a train. The apparatus includes means for providing signals indicative of grade information to a computer on the train, means for providing the computer with signals indicating axle speed, means for providing the computer with signals indicating brakepipe pressure, and means for providing the computer with signals indicating tractive effort from the locomotive or locomotives. The apparatus also includes means for providing the computer with signals embodying a computer program for utilizing the signals indicating grade information, the signals indicating axle speed, the signals indicating brakepipe pressure and the signals indicating tractive effort to generate signals indicative of braking efficiency.

OBJECTS OF THE INVENTION

It is, therefore, one of the primary objects of the present invention to provide a method and apparatus for precise control of brakes on railway vehicles disposed in a train consist.

It is an additional object of the present invention to provide a railway braking system in which braking efficiency calculations are initially made from values predetermined before dispatch of the train, and which are updated during the run by information obtained during brake applications.

It is a further object of the present invention to provide an apparatus which gives the operator of the train indications of braking distance which are based on parameters that are updated during the run by information obtained during brake applications.

It is an additional object of the present invention to provide an apparatus in which a check on the predetermined value for the weight of the train can be achieved, and that provides an improved value for the weight of the train during the course of a run.

It is a further object of the present invention to provide an apparatus in which brake performance checks during routine brake applications can be accomplished, which may indicate a need for reduced speed until an inspection point is reached, or a need for stopping the train.

It is a further object of the present invention to provide an apparatus in which brake performance checks during routine brake applications can be accomplished, and thereby, with regulatory change, to reduce the requirement for visual inspection of the brakes.

A further object of the present invention is to provide an apparatus that provides the engineer with calculations based on updated train parameters which provide stopping distances for various brake application levels.

A further object of the present invention is to provide an apparatus wherein rolling resistance data during a run which include the effect of air resistance due to the current wind condition can be utilized to achieve improved braking efficiency.

In addition to the various objects and advantages of the present invention described above, it should be noted that various other objects and advantages of the present invention will become more readily apparent to those persons who are skilled in the railway braking control art from the following more detailed description of the invention, particularly, when such description is taken in conjunction with the attached drawing and with the appended claims.

BRIEF DESCRIPTION OF THE DRAWING

FIG. 1 is a schematic drawing which shows the onboard computer of this invention, with input signals provided to the computer, and output signals obtained from the computer.

DETAILED DESCRIPTION OF THE INVENTION

Referring to FIG. 1, illustrated therein are the essential details of a presently most preferred embodiment of the present invention. The apparatus of the invention, indicated generally as 10, includes an onboard computer central processor unit 15. A data input channel 20 provides means for installing instructions in the CPU, the instructions being for directing the computer to process data signals to generate signals for the required displays.

A data input channel 25 provides means for installing data in the CPU which represents a track database. This database has grade and curve information versus position, and optionally may also have curve banking data. This database may contain information for an entire railroad.

A data input channel 30 provides means for installing data in the CPU which is specific to the train. In a switchyard, when a train is assembled, data relating to the cars constituting the train are available. A person skilled in the art will recognize that this information is generally supplied by the railroad data network. The weights of the individual cars, and hence the weight of the entire train is generally known from this information.

A data input channel 35 provides means for providing information regarding tractive effort exerted by the locomotive or locomotives which move the train. Information regarding tractive effort may be supplied to channel 35 by a trainline which joins the locomotives in a consist, or may be supplied by a radio data link from locomotives in a remote consist. This input channel may include an analog-to-digital converter.

Likewise, input channel 40 provides information regarding dynamic braking of the locomotive or locomotives which move the train. This channel also may include a radio link, and may include an analog-to-digital converter.

Input channel 45 provides means for input of signals representing brakepipe pressures. One signal would represent pressure in the brakepipe of the locomotive which has the compressor for the brake air supply. This value may be obtained from a transducer having fluid pressure connection to the brakepipe, or a transducer having fluid pressure connection to the equalizing reservoir, or the value may be obtained from a signal representing the equalizing reservoir setpoint value. Another signal may come from an end of train unit. This signal may be provided through a radio data link. This channel may include an analog to digital converter.

Input channel 50 accepts signals from a rail navigation system which establishes the position of the train in relation to the track database.

Input channel 55 accepts signals from an axle speed sensor.

Output channel 70 supplies a signal representing the weight of the train to 75, a train weight display.

Output channel 80 supplies a signal indicating brake performance to 85, a brake performance display. This display may include an audio alarm to indicate dangerous or unacceptable brake performance.

Output channel 90 supplies a signal indicating braking distance to 95, a braking distance display. This signal depends on the speed of the train. It may also include effects due to grade, track curvature, and banking of the track on which the train moves. This track information would be obtained from the track database, and the position of the train in relation to the track database. The calculation of braking distance may be based on data which is refined during a run during normal brake applications. This display may also include an input (not shown) for the operator to specify a type of brake application. This can be an emergency application, a full service brake application, or an application corresponding to an operator selectable brakepipe pressure reduction.

Turning now to a discussion of the methods of making the required computations a number of examples follow.

A person skilled in the art will be familiar with the Davis formula, which provides a value for the rolling friction. This depends principally on the weight of the train, and is fairly constant with speed. The component due to air resistance depends nonlinearly on speed.

A first sanity check of train weight as initially input to the computer may be made from the rolling resistance, due to the strong dependency of rolling resistance on train weight.

Knowledge of train weight can also be obtained or updated when the train is ascending a constant grade at a constant velocity, and the brakes are not applied. The component of the weight force vector which is parallel to the track equals the tractive effort minus the rolling resistance. From that component of the weight force vector and the grade (known from the track database), the weight can be obtained.

Refined knowledge of train weight can also be obtained when the brakes are not applied, and the train is accelerating on a track having a constant grade. The tractive effort minus the rolling resistance equals the mass of the train times its acceleration plus the component of weight parallel to the track. From this relationship, the weight of the train can be obtained.

Information regarding the distribution of weight along the length of the train can be obtained from similar data obtained on a track having a variable grade. As an example, consideration is given to a track having a section with a constant positive grade which is followed by a section having zero grade. If a train climbs this grade, and reaches the section which has zero grade, then for every car of the train which is on the positive grade, the train experiences a retarding force equal to the component of the car's weight vector which is parallel to the track. As each car reaches the portion of track having a zero grade, the retarding force due to its weight is eliminated.

A more general approach for a train on a track which has arbitrarily-varying grade is to make a balance of trackwise forces. The following formula applies for a case of a train on a track with varying grade, but in which slack between the cars is neglected:

Mass of entire train*acceleration of train=
Tractive effort−rolling resistance−
Summation of (Car weight*%Grade/100) for all the cars By obtaining information as above for many sections of track having varying grades, simultaneous equations can be obtained for the weight in different portions of the train. Using standard solution techniques, these can be solved to obtain the weights of different portions of the train.

Knowledge of the distribution of weight along the length of the train is important for making stopping distance calculations for a train on a track having a variable grade. Information regarding the distribution of weight along the length of the train is available from the train specific data obtained before departure, and that information may be checked and/or refined by the procedure above.

Information regarding the ability of the brakes to decelerate the train can be updated with each normal brake application during the course of a run. The effect caused by a given amount of brakepipe reduction is obtained from the speed reduction per unit time, and the acceleration or deceleration caused by grade.

For a calculation of stopping distance for a brakepipe pressure reduction which has not been previously applied, interpolation or extrapolation may be done on data obtained at other values of brakepipe pressure reduction for which data have been obtained. Likewise, calculation of stopping distance on a grade which has not previously been experienced can be made by including acceleration due to the trackwise component of gravity along with the deceleration due to the brakes.

Brake performance calculations can also be made based on each event when brakes are applied. In effect, every brake application becomes an experiment which tests the brakes, and provides quantitative information regarding their condition.

Now discussing the invention more generally, in a first aspect, the present invention provides a method for providing improved control of brakes on railroad cars in a train. The method involves providing signals indicating grade information to a computer on the train, providing the computer with signals indicating axle speed, providing the computer with signals indicating brakepipe pressure, and providing the computer with signals indicating tractive effort from the locomotive or locomotives. Instructions are provided in the computer for processing these data to obtain data regarding performance of the brakes. Signals regarding dynamic braking of the locomotive or locomotives may also be included in these calculations.

The signals indicating brakepipe pressure may be obtained from a transducer with fluid pressure connection to the brakepipe in the locomotive which has the compressor which provides air to the brakepipe. Pressure signals may also be obtained from a transducer in a vehicle of the train which is remote from the locomotive. This transducer may be in an end of train unit, and the information may be transmitted by a radio data link.

Grade information for this method may be obtained from a track grade database, used with signals obtained from a rail navigation system which indicate the position of the train in relation to the track grade database.

Track curvature data may also be available from a track database. The curvature data affects the rolling friction, and the braking efficiency of the train. Track banking data may also be available from a track database, and this affects both the rolling resistance and the braking performance.

The method can be used to check the value of train weight obtained before departure of the train, or it may be used for determining the train weight, or for providing an improved value for train weight.

The braking efficiency information obtained can be used to provide the operator with signals indicating stopping distance. These may correspond to an emergency brake application, a full service brake application, or a selectable brake application which is smaller than a full service application. The engineer, may, for example, obtain a stopping distance calculation corresponding to a brakepipe reduction of a certain number of psi.

In an additional aspect, the invention provides apparatus for improved control of brakes on a train. An onboard computer is provided to make the calculations required. This may be a computer dedicated to these calculations, or it may be an on-board computer which serves other purposes as well. Means are provided for providing signals indicating grade information to the computer, and for providing signals indicating axle speed. Means are also provided for input of signals indicating brakepipe pressure, and signals indicating tractive effort of the locomotive or locomotives. Instructions are provided in the computer to process the signals cited above to generate signals which represent various quantities related to braking efficiency.

Apparatus may also be included to provide information regarding dynamic braking from the locomotive or locomotives which move the train, in which case signals representing instructions for using that information are provided in the computer.

The apparatus for obtaining brakepipe pressure may be a pressure transducer having fluid pressure connection to the brakepipe of the locomotive which has the compressor which supplies the brakepipe.

Apparatus for brakepipe pressure may also include a transducer in a car which is remote from the locomotive. This may be in an end of train unit. Apparatus for sending this information to the computer may include a radio data link.

Apparatus for providing track grade information may include means for receiving signals from a track grade database, and apparatus for receiving signals indicating train location in relation to the database from a rail navigation system.

Means may be provided for receiving signals from a track curvature database, and means for receiving signals indicating train location in relation to the track curvature database.

Means may be provided for receiving signals from a track banking database, and means for receiving signals indicating train location in relation to the track banking database.

Means may be provided for using the above signals to check the train weight, calculate the train weight, or obtain a refined value for the train weight.

Means may be provided to display to the train operator an indication of stopping distance corresponding to an emergency brake application, a full service brake application, or a selectable brake application smaller than a full service brake application.

While the presently preferred embodiment for carrying out the instant invention has been set forth in detail in accordance with the Patent Act, those persons skilled in the railroad braking art to which this invention pertains will recognize various alternative ways of practicing the invention without departing from the spirit and scope of the appended claims.

Accordingly, to promote the progress of science and useful arts, I secure for myself by Letters Patent for a limited time exclusive rights to all subject matter embraced by the following claims.

I claim:

1. A method for providing improved control of brakes on railway vehicles disposed in a train drawn by at least one operating locomotive, said method comprising:

(a) communicating signals indicative of grade information to an onboard computer disposed on such train, said step of communicating signals indicative of grade information including the step of utilizing a track grade database and signals indicative of train position in relation to such track grade database from a rail navigation system;

(b) providing said onboard computer with signals indicative of axle speed from at least one of such vehicles of such train;

(c) providing said onboard computer with signals indicative of brakepipe pressure;

(d) providing said onboard computer with signals indicative of tractive effort from such at least one operating locomotive; and (e) providing said onboard computer with signals defining computer programs to utilize said signals obtained in steps (a) through (d) above to generate signals indicating at least one braking efficiency parameter of such train, thereby providing said improved control of such brakes.

2. A method according to claim 1 further comprising the steps of providing said onboard computer with signals indicative of dynamic braking from such at least one operating locomotive on such train; and including in step (e) the additional step of providing in said computer signals indicative of computer programs to utilize said signals indicative of dynamic braking for generating said at least one braking efficiency parameter of such train.

3. A method according to claim 1 wherein said signals indicative of brakepipe pressure include signals representing a first brakepipe pressure in a first one of such at least one operating locomotive having a compressor providing air to such brakepipe.

4. A method according to claim 1 wherein said signals indicative of brakepipe pressure include signals representing a second brakepipe pressure in a portion of such brakepipe in at least one of such vehicles remote from such locomotive.

5. A method according to claim 4 wherein said second brakepipe pressure is obtained by an end of train unit.

6. A method according to claim 1 further comprising the step of providing said onboard computer with track curvature data and the step of determining a position of such train in relation to such track curvature data.

7. A method according to claim 6 further comprising the step of providing said onboard computer with curve banking data and the step of determining a position of such train in relation to such curve banking data.

8. A method according to claim 1 further comprising the step of at least one of checking train weight, determining train weight, and providing an improved value for train weight.

9. A method according to claim 1 further comprising the step of providing stopping distance signals to an operator of such train, such stopping distance signals corresponding to at least one of an emergency brake application, a full service brake application, and a selectable brake application smaller than a full service brake application.

10. An apparatus for providing improved control of brakes on railway vehicles disposed in a train drawn by at least one operating locomotive, said apparatus comprising:

(a) means for communicating signals indicative of grade information to an onboard computer disposed on such train, said means for communicating signals indicative of grade information including means for utilizing a track grade database and signals indicative of train position in relation to such track grade database from a rail navigation system;

(b) means for providing such onboard computer with signals indicative of axle speed from at least one of such vehicles of such train;

(c) means for providing such onboard computer with signals indicative of brakepipe pressure;

(d) means for providing such onboard computer with signals indicative of tractive effort from such at least one operating locomotive; and (e) means for providing such onboard computer with signals defining computer programs to utilize said signals indicative of grade information, said signals indicative of axle speed, said signals indicative of brakepipe pressure, and said signals indicative of tractive effort to generate signals indicative of at least one braking efficiency parameter, thereby providing said improved control of such brakes.

11. An apparatus according to claim 10 further comprising means for providing such onboard computer with signals indicative of dynamic braking from such at least one operating locomotive on such train; and means for providing in such computer signals indicative of instructions to utilize said signals indicative of dynamic braking for generating said signals indicative of at least one braking efficiency parameter of such train.

12. An apparatus according to claim 10 wherein said signals indicative of brakepipe pressure include signals representing a first brakepipe pressure in a first one of such at least one operating locomotive having a compressor providing air to such brakepipe.

13. An apparatus according to claim 10 wherein said signals indicative of brakepipe pressure include signals representing a second brakepipe pressure in a portion of such brakepipe in at least one of such vehicles remote from such locomotive.

14. An apparatus according to claim 13 wherein said second brakepipe pressure is obtained by an end of train unit.

15. An apparatus according to claim 10 further comprising means for providing said onboard computer with track curvature data and means for determining a position of such train in relation to such track curvature data.

16. An apparatus according to claim 15 further comprising means for providing said onboard computer with curve banking data and means for determining a position of such train in relation to such curve banking data.

17. An apparatus according to claim 10 further comprising means for at least one of checking train weight, determining train weight, and providing an improved value for train weight.

18. An apparatus according to claim 10 further comprising means for providing stopping distance signals to an operator of such train, such stopping distance signals corresponding to at least one of an emergency brake application, a full service brake application, and a selectable brake application smaller than a full service brake application.

* * * * *